United States Patent [19]

Fish

[11] Patent Number: 5,834,525
[45] Date of Patent: Nov. 10, 1998

[54] POLYMER-SUPPORTED SULFONATED CATECHOL AND LINEAR CATECHOL AMIDE LIGANDS AND THEIR USE IN SELECTIVE METAL ION REMOVAL RECOVERY FROM AQUEOUS SOLUTIONS

[75] Inventor: Richard H. Fish, Berkeley, Calif.

[73] Assignee: The Regents of the University of California, Oakland, Calif.

[21] Appl. No.: 839,359

[22] Filed: Apr. 17, 1997

Related U.S. Application Data

[63] Continuation of Ser. No. 389,851, Feb. 17, 1995, Pat. No. 5,622,996.
[51] Int. Cl.$^6$ .................. C08F 8/36; C08F 8/24; C02F 1/42
[52] U.S. Cl. ............... 521/33; 210/688; 521/30; 525/344; 525/353; 525/384; 525/534; 525/535
[58] Field of Search .................. 521/33; 525/353, 525/384, 534; 210/688

[56] References Cited

U.S. PATENT DOCUMENTS

| | | | |
|---|---|---|---|
| 4,442,305 | 4/1984 | Weitl et al. | 562/451 |
| 4,552,854 | 11/1985 | Fish et al. | 502/26 |
| 4,604,191 | 8/1986 | Fish et al. | 208/251 |
| 5,073,575 | 12/1991 | Blanch et al. | 521/33 |

OTHER PUBLICATIONS

A. Martell, (1959) *Organic Sequestering Agents;* John Wiley & Sons, Inc.; Chap 8, p. 416.
K.N. Raymond, (1990), *Coord. Chem. Rev.*, 105, 135, and references therein.
T.D.P. Stack, et al; (1992) *J. Amer. Chem. Soc.* 114, 1512.
T.D.P. Stack, et al; (1993) *J. Amer. Chem. Soc.,* 115, 6466.
C.G. Pierpont, et al (1994) The Chemistry of Transition Metal Complexes Containing Catechol and Semiquinone Ligands in: *Progress in Inorganic Chemistry,* Karlin, K.D. (Ed.) John Wiley & Sons Publishers: New York, vol. 41, p. 331.
A. Warshawsky, (1986), Modern Research in Ion Exchange, in: *Ion Exchange: Science and Technology,* Rodrigues, A., (Ed) Martinus Nijhoff Publishers: Dordrecht, 1986, p. 67.
E. Blasius, et al; (1967) Chelating Ion Exchange Resins, in: *Chelates in Analytical Chemistry;* Flaschka, H.A.; Barnard, J.A., Eds: Marcel Decker: New York.

R.H. Fish, et al (1985) *Inorg. Chem.,* 24, 4456.
R.H. Fish, et al (1987) *Reactive Polymers* 6, 255.
M. Griesbach, et al (1980) *Fresenius Z. Anal. Chem.,* 302, 209.
M. Griesbach, et al (1980) *Angew, Fresenius Z. Anal. Chem.,* 302, 181.
M. Griesbach, et al (1980) *Angew. Makromol. Chem.,* 90, 143.
R.H. Fisher, et al (1985) and A. Butler, et al (1992), *C.J. Inorg. Chem.,* 315072.

*Primary Examiner*—Fred Zitomer
*Attorney, Agent, or Firm*—Paul R. Martin; Howard Peters

[57] ABSTRACT

The present invention concerns the synthesis of several biomimetically important polymer-supported, sulfonated catechol (PS-CATS), sulfonated bis-catechol linear amide (PS-2-6-LICAMS) and sulfonated 3,3-linear tris-catechol amide (PS-3,3-LICAMS) ligands, which chemically bond to modified 6% crosslinked macroporous polystyrene-divinylbenzene beads (PS-DVB). These polymers are useful for the for selective removal and recovery of environmentally and economically important metal ions from aqueous solution, as a function of pH. The $Fe^{3+}$ ion selectivity shown for PS-CATS, PS-2-6-LICAMS, and PS-3,3-LICAMS polymer beads in competition with a similar concentration of $Cu^{2+}$, $Zn^{2+}$, $Mn^{2+}$, $Ni^{2+}$, $Mg^{2+}$, $Al^{3+}$, and $Cr^{3+}$ ions at pH 1–3. Further, the metal ion selectivity is changed at higher pH values in the absence of $Fe^{3+}$ (for example, $Hg^{2+}$ at pH 3). The rates of selective removal and recovery of the trivalent metal ions, e.g. $Fe^{3+}$ $Al^{3+}$ ion etc. with the PS-CATS, PS-2-6-LICAMS, and PS-3,3-LICAMS polymer beads used determined are useful as well as equilibrium selectivity coefficient ($K_m$) values for all metal competition studies. The chelate effect for the predisposed octahedral PS-3,3-LICAMS polymer pendant ligand is the reason that this ligand has a more pronounced selectivity for $Fe^{3+}$ ion in comparison to the PS-CATS polymer beads. The predisposed square planar PS-2,6-LICAMS series of polymer pendant ligands are more selective to divalent metal ions $Cu^{2+}$, $Zn^{2+}$, $Mn^{2+}$, $Ni^{2+}$, and $Mg^{2+}$, than either PS-CATS or PS-3,3-LICAMS. However, $Fe^{3+}$ ion still dominates in competition with other divalent and trivalent metal ions. In the absence of $Fe^{3+}$, the polymer ligand is selective for $Al^{3+}$, $Cu^{2+}$ or $Hg^{2+}$. The changing of the cavity size from two $CH_2$ groups to six $CH_2$ groups in the PS-2-6-LICAMS polymer pendant ligand series does not effect the order of metal ion selectivity.

17 Claims, 5 Drawing Sheets

POLYMER-SUPPORTED SULFONATED CATECHOL AND LINEAR CATECHOL AMIDE LIGANDS AND THEIR USE IN SELECTIVE METAL ION REMOVAL RECOVERY FROM AQUEOUS SOLUTIONS

This is a continuation of application Ser. No. 08/389,851, filed on Feb. 17, 1995, now U.S. Pat. No. 5,622,996.

ORIGIN OF THE INVENTION

This invention was supported by the U.S. Department of Energy, Contract no. DE-AC03-76SF00098. The Government has certain rights in this invention.

BACKGROUND OF THE INVENTION

1. Field of the Invention

The present invention concerns novel polymer supported sulfonated catechol ligands which are selective for ions (e.g. $Fe^{3+}$) generally at low pH in the presence of other metal ions in aqueous solutions. The ion, usually a trivalent ion (e.g. $Fe^{3+}$) is subsequently recovered from the polymer by a lowering in pH.

2. Description of the Problem and Related Art

There is a growing need in the relatively new area of environmental inorganic chemistry to design organic ligands in order to selectively remove and recover environmentally and economically important metal ions from aqueous solution. One approach to designing organic ligands for these purposes is to look at biological systems for examples on selective metal ion complexation, see A. Martell, (1959) *Organic Sequestering Agents*; John Wiley & Sons, Inc.; Chap 8, p.416. Thus, the biomimetic approach has provided an array of organic ligands that fulfill the requirements of high selectivity to certain metal ions, especially for $Fe^{3+}$ ion, due to its predisposition for octahedral coordination. See K. N. Raymond, (1990), *Coord. Chem. Rev.* 105,135 and references therein, T. D. P. Stack et al; (1992), *J. Amer. Chem. Soc.* 114, 1512; T. D. P. Stack; (1993) *J. Amer. Chem. Soc.* 115, 6466, and C. G. Pierpont, et al (1994), The Chemistry of Transition Metal Complexes Containing Catechol and Semiquinone Ligands in: *Progress in Inorganic Chemistry*, Karlin, K. D. (Ed.) John Wiley & Sons Publishers: New York, Vol 41, p. 331.

However, the selective removal and recovery of metal ions from environmental aqueous solutions must be cost-effective. Therefore, the anchoring of these selective ligands to solid supports is mandatory for continual reuse. See A. Warshawsky, (1986), Modern Research in Ion Exchange, in: *Ion Exchange: Science and Technology*, Rodrigues, A. (Ed.) Martinus Nijhoff Publishers: Dordrecht, 1986, p. 67; and E. Blasius et al; (1967) Chelating Ion Exchange Resins, in: *Chelates in Analytical Chemistry*; Flaschka, H. A.; Barnard, J. A., Eds: Marcel Decker: New York. In prior polymer pendant ligand chemistry studies, the synthesis of a polymer bound catechol ligand for non-aqueous solution metal ion complexation is described. See R. H. Fish, et al (1985). Inorg. Chem., 24, 4456; and R. H. Fish et al, (1987) Reactive Polymers 6, 255. The diffusion of the metal ions into the hydrophobic polymer matrix is so important that it is highly desirable to modify the catechol ligands with a hydrophilic group, such as a sulfonic acid substituent, to increase the kinetics and capacities of metal binding in aqueous solution, while also preventing the catechol ligand from being oxidized to the weaker metal binding O-quinone ligand.

With regard to a previous synthesis of a polymer pendant sulfonated catechol ligand, see M. Griesbach et al (1980) *Fresenius Z. Anal. Chem.*, 302, 109; M. Griesbach et al (1980) Angew. *Fresenius Z. Anal. Chem.*, 302, 181; and M. Griesbach et al (1980) *Angew. Makromol. Chem.* 90, 143. Griesbach described a number of organic ligands that were chemically bound to 2–3% crosslinked polystyrene-divinylbenzene beads (PS-DVB) via an azo group linkage reaction. Among the many ligands attached using the procedure, the 3,5-disulfonatecatechol ligand (TIRON) was also described. However, the stability of the azo linkage at low pH is suspect. Further, the metal ion selectivity found for the polymer-supported azo-linked TIRON ligand appears different from the present data.

The following references are specific and general of interest:

F. W. Weitl et al, U.S. Pat. No. 4,442,305 disclose monomeric poly-catecholamide chelating agents.

R. H. Fish, U.S. Pat. No. 4,552,854 discloses the treatment of a spent catecholated polystyrene to recover arsenic compounds.

R. H. Fish, U.S. Pat. No. 4,604,191 discloses a method of removal of arsenic, vanadium and/or nickel compounds from petroliferous liquids using a catecholated polystyrene polymer.

H. W. Blanch et al, U.S. Pat. No. 5,073,575 disclose the use of a polystyrene polymer having dithiol groups to chelate cadmium ion.

All patents, applications, articles, standards and the like are incorporated herein by reference in their entirety.

None of these references individually or collectively teach or suggest the present invention.

As is seen from the above text, there is a need for a method to selectively remove iron and other ions from aqueous solution having a mixture of metal ions present. The method and polymer having a catechol amide ligand described herein below solve this problem.

SUMMARY OF THE INVENTION

The present invention concerns a polymer having a pendant sulfonated catechol ligand of Structure (I) or (II):

-continued

POLYMER (II)

wherein
n is an integer from 2 to 6;

X and Y are independently selected from the group consisting of H, $SO_3H$, $SO_3M$, COOH, or COOM, provided that both of X or Y are not hydrogen, and provided that in Structure (II) group Y is not H, M is a metal atom selected from the group consisting of alkali metals and alkaline earth metals.

In one embodiment in Structure (I), the X and Y groups are at the 5-position on the benzene ring relative to the carbonyl group at the 1-position.

In one embodiment, the groups X and Y are identical and are selected from the group consisting of $SO_3M$ wherein M is an alkali metal atom.

In another embodiment in Structure (II), the Y groups are in the 5 and 6 positions.

In another embodiment, the polymer is a water-insoluble polymer, preferably a divinylbenzene crosslinked polystyrene polymer.

In another embodiment, the X and Y groups are equal and are selected from the group consisting of $SO_3H$ and $SO_3M$ wherein M is selected from sodium or potassium;

X and Y are at the 5-position on the benzene ring relative to the carbonyl group at the 1-position; and the polymer is a water-insoluble divinylbenzene crosslinked polystyrene.

In another embodiment, the present invention relates to a process for the preparation of polymer-ligand of Structure (I):

POLYMER (I)

wherein
n is an integer from 2 to 6 inclusively;

X and Y in each ligand are independently selected from the group consisting of H, $SO_3H$, $SO_3M$, COOH and COOM, wherein M is an alkaline metal, provided that both of X and Y are not H; and POLYMER is a water-insoluble polymer having multiple covalently attached ligands, which process comprises:
(a) chloromethylating a benzene containing polymer using chloromethylation reagents;
(b) reacting the isolated product of step (a) with a difunctional amine of the structure:
$H_2N(CH_2)_nNH_2$
in a polar aprotic solvent at ambient conditions for between about 2 and 50 hr and isolating the product;
(c) reacting the isolated product of step (b) a substituted acid halide of the structure:

wherein X is chloro or bromo, and $R^1$ and $R^2$ are alkyl having 1 to 4 carbon atoms, in a polar aprotic solvent and an organic base at between about 20° and 70° C. for between about 10 and 36 hr followed by isolation of the product;
(d) swelling the isolated product of step (c) in a halogenated alkane;
(e) reacting the isolated product of step (d) with $BBr_3$ in a polar aprotic solvent for between about 0° and 20° C. for between about 1 and 24 hr;
(f) reacting the isolated product of step (e) with 90% to fuming sulfuric acid at about 0° C. for between about 10 and 60 min; and
(g) isolating the polymer.

In still another embodiment, the present invention refers to a process for the preparation of a polymer-ligand of Structure (II):

POLYMER (II)

wherein POLYMER is a water insoluble polymer having multiple covalently attached ligands; and Y in each ligand is independently selected from the group consisting $SO_3H$ and $SO_3M$, where M is an alkaline metal, which process comprises
(a) chloromethylating reagents and conditions;
(b) reacting the product of step (a) with a catechol in the presence of a Lewis acid catalyst at between about 20° and 100° C. and for between 0.5 and 72 hr, preferably stannic chloride in benzene at between about 50° and 100° C. for about 48 hr;
(c) reacting the product of step (b) with excess fuming sulfuric acid at about 0° C. and ambient temperature for between about 1 and 5 hr; and
(d) isolating and recovering the polymer-ligand of Structure (II).

DETAILED DESCRIPTION OF THE INVENTION AND PREFERRED EMBODIMENTS

Definitions as described herein:

"Chloromethylation reagents" refers to those combinations of chemicals which will add a $-CH_2Cl$ group to a substituted or unsubstituted phenyl ring. These reagents include for example, $ClCH_2OCH_2(CH_2)_6CH_3$ and Lewis acid such as $SnCl_4$.

"Polymer" refers to the backbone of the water-insoluble polymer. This POLYMER can be any combination of carbon, hydrogen, nitrogen, oxygen atoms or mixtures of these atoms, to which can be attached pendant groups (or the polymer already has pendant groups). Homopolymers, copolymers, block polymers, segmented polymers or the like are useful so long as the resulting polymer is water-insoluble. Preferred polymers are 'Chelex' or any aromatic polymer (e.g. aromatic polycarbonate) in which the aromatic group can be chloromethylated (to add $-CH_2Cl$) according to convention reaction methods, and followed by the reactions described herein.

The present invention provides the structures, preparations and uses of novel polymer-ligands. The polymer Structures (I) and (II) described herein when placed in a solution containing metal cations provide a means to selectively remove specific cations. The competition for a specific cation is usually dependent on the pH of the solution.

Normally trivalent cations are preferred and are bound to the ligand when in the presence of divalent cations.

Thus, with the present invention it is possible to sequentially remove a specific cation, e.g. $Fe^{3+}$ from the aqueous solution, change the pH of the solution and remove a second cation, e.g. $Al^{3+}$. The selectivity of the polymer structures is described herein and can easily be extended to other ions, $Cu^{2+}$, etc. by one of skill in the art.

An important aspect of the present invention is the selective mono- and di-sulfonation of the pendant catechol (or its protected precursor) rather than global sulfonation of the pendant group and also the polymer backbone. The water insoluble polymer has a molecular weight sufficiently high to maintain the water insolubility.

The specific sulfonate groups on the ligand dramatically increase the reaction kinetics of the ligand to the trivalent metal(s), and also increase the water solubility of the ligand portion.

The present invention includes results for the synthesis of several biomimetically important sulfonated catechol (PS-CATS), sulfonated 2 to 6-linear catechol amide (PS-2-6-LICAMS), and sulfonated 3,3-linear catechol amide (PS-3,3-LICAMS) ligands that are chemically bonded to modified 6% crosslinked polystyrene-divinylbenzene beads (PS-DVB) for selective removal and recovery of environmentally and economically important metal ions from aqueous solution, as a function of pH. This is the first reported example of the synthesis of predisposed, sulfonated linear catechol amide ligands that are chemically bonded to modified PS-DVB beads for selective metal ion complexation from aqueous solutions. The polymer-supported pendant ligand allows for a far greater selectivity to $Fe^{3+}$ ions in comparison to a non-predisposed ligand; i.e., PS-3,3-LICAMS >>PS-CATS. The predisposed PS-2-6-LICAMS ligands were more selective to divalent metal ions than either the PS-3,3-LICAMS or PS-CATS ligands.

Synthesis of PS-CATS, PS-2-6-LICAMS, and 3,3-LICAMS Polymer Pendant Ligands The precursor polymer pendant ligands, PS-CAT, 2-6-LICAM, and 3,3-LICAM, were synthesized by adaptation of techniques described by R. H. Fish et al (1985) and A. Butler et al (1992), C. J. Inorg. Chem. 31, 5072 and references therein. The synthesis uses a 6% crosslinked chloromethylated PS-DVB polymer, while selective sulfonation of these precursor polymer-supported catechol ligands was accomplished with 23% fuming sulfuric acid (PS-CAT, 0° C., 3 h; 25° C., 2 h), or for 2-6-LICAM/PS-3,3-LICAM with 93% sulfuric acid (0° C., 15 minutes; 25° C., 30 min.). Elemental analysis, FT-IR measurements supported the structures for the PS-CATS (19 mmol/g), 2-6-LICAMS (average value, 0.55 mmol/g) and PS-3,3-LICAMS (0.53 mmol/g) polymer pendant ligands bound to modified 6% PS-DVB beads (equations 1–3 below).

The precursor polymer pendant ligands, PS-CAT, 2-6-LICAM, and 3,3-LICAM, were synthesized by adaptation of techniques described by R. H Fish et al (1985) and A. Butler et al (1992). The synthesis uses a 6% crosslinked chlorom-ethylated PS-DVB polymer, while selective sulfonation of these precursor polymer-supported catechol ligands was accomplished with 23% fuming sulfuric acid (PS-CAT, 0° C., 3 h; 25° C., 2 h), or for 2-6-LICAM/PS-3,3-LICAM with 93% sulfuric acid (0° C., 15 minutes; 25° C., 30 min). Elemental analysis, FT-IR spectra, and in selected cases, 100 MHz CP-MAS[13]C NMR studies, all measurements supported the structures for the PS-CATS (1.9 mmol/g), 2-6-LICAMS (average value, 0.55 mmol/g) and PS-3,3-LICAMS (0.53 mmol/g) polymer pendant ligands bound to modified 6% PS-DVB beads (equations 1–3 below).

PREPARATION OF 2,6-LICAMS $[(PS-CATS)_2-Fe(H_2O)_2]^-$

Figure 1:
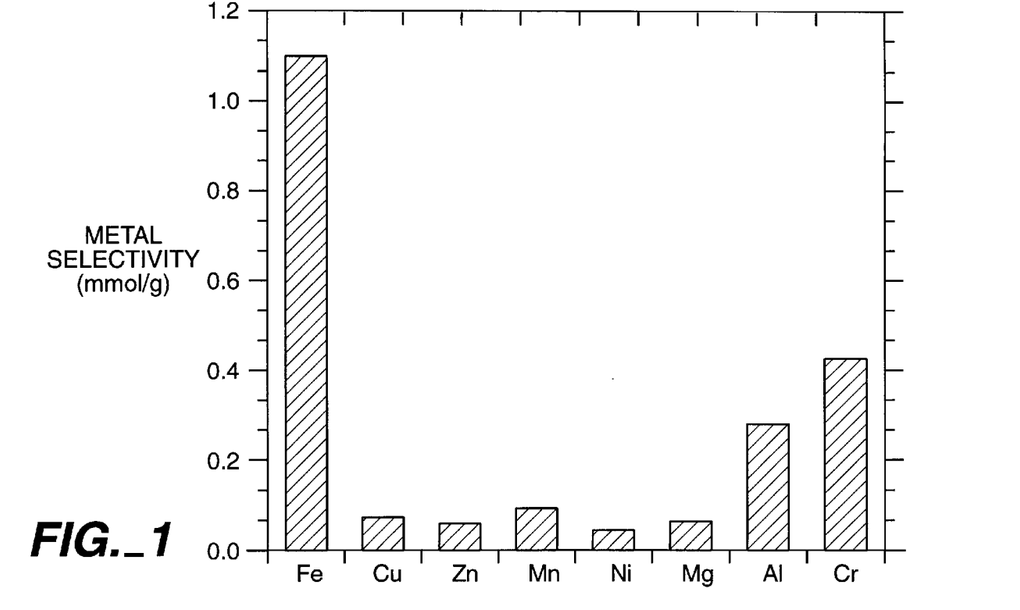
FIG. 1 is a graphic representation of metal selectivity of the PS-CATS ligand (1.9 mmol/g) at pH 2.1
Figure 2:
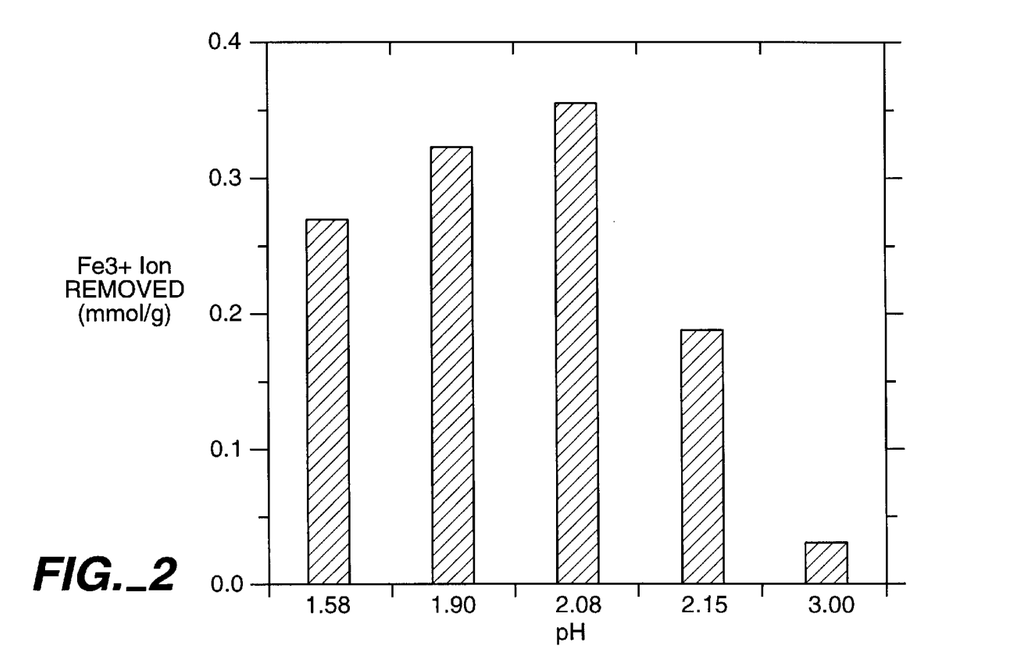
FIG. 2 is a graphic representation of the pH profile of $Fe^{3+}$ removal by the PS-CATS ligand. Samples of 100 mg of PS-CATS polymer beads were allowed to react with 10 ml of a 0.02M $Fe^{3+}$ solution with rigorous shaking for 30 min at different pH values.

PS-CATS Metal Ion Selectivity, Selectivity Coefficient Values ($K_m$), and Kinetic Studies, as a Function of pH The homogenous versions of the PS-CATS (known commercially as TIRON) and PS-3,3-LICAMS ligands have been shown to selectively complex $Fe^{3+}$ ion in aqueous solution, Martell (1959) p.515 and F. L. Weitl et al (1979), J. Med. Chem., 22, 1281. The selectivity of the polymer pendant versions with $Fe^{3+}$ ion (0.02M) in the presence of a similar concentration of $Cu^{2+}$, $Zn^{2+}$, $Mn^{2+}$, $Al^{3+}$, $Ni^{2+}$, $Cr^{3+}$, and $Mg^{2+}$ ions was examined. FIG. 1 shows the selectivity of the PS-CATS polymer to $Fe^{3+}$ ion in the presence of the above-mentioned metal ions at pH 2.1, where maximum $Fe^{3+}$ ion removal from aqueous solution was observed (FIG. 2). The equilibrium selectivity coefficients ($K_m$ values) were found, see F. Weitl et al. (1979); R. W. Grimshaw, et al (1975) Ion Exchange: Introduction to Theory and Practice: The Chemical Society, Monograph for Teachers, Number 29, p 73, with $Mg^{2+}$ as the standard, to be: ($M^{n+}/Mg^{2+}$); 171 ($Fe^{3+}$); 66 ($Cr^{3+}$; 43 ($Al^{3+}$); 5.0 ($Mn^{2+}$); 0.8 ($Cu^{2+}$);0.8 ($Zn^{2+}$);0.3 ($Ni^{2+}$);1 ($Mg^{2+}$). These results further demonstrate the high selectivity of PS-CATS for $Fe^{3+}$ in competition with other metal ions.

Figure 3:
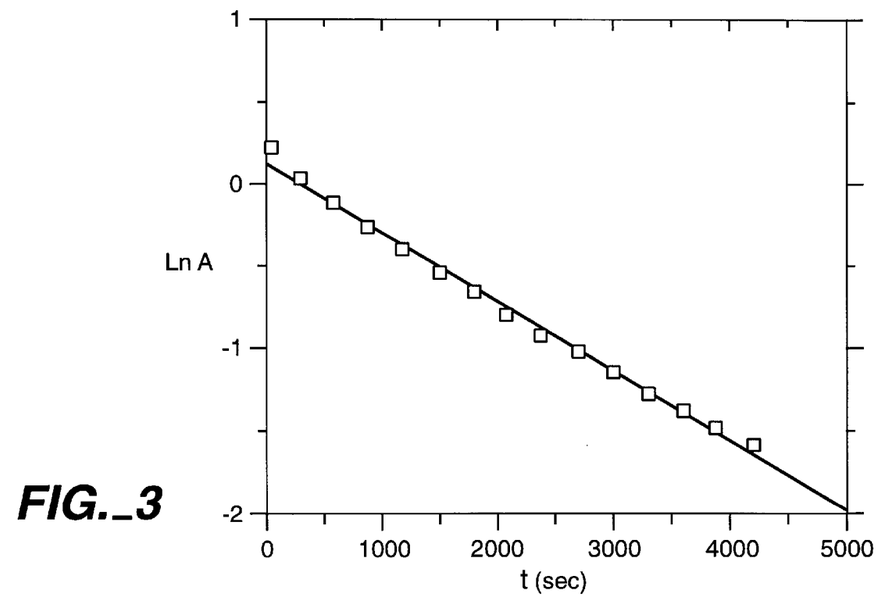
FIG. 3 is a graph showing of the kinetic plot of In A (absorbance) vs t (sec) for $Fe^{3+}$ ion removal with the PS-CATS ligand at 25° C. and pH 2.1. The $Fe^{3+}$ ion removal kinetic rates were followed by the decay of the absorption maximum at 460 nm using Uv/vis spectrometry.

The ratio of PS-CATS/$Fe^{3+}$ at equilibrium is found to be close to 2:1. Presumably with $H_2O$ molecules occupying the other octahedral sites around $Fe^{3+}$. $Fe^{3+}$ removal capacity at equilibrium was found to be 1.1 mmol/g. The bonding of the (($PS-CATS_2$-Fe) complex appears to be exclusively to the catechol groups rater than the sulfonic acid substituents as determined by its FT-IR spectrum (free sulfonic acid bands, $vS=O$, at 1220 and 1175 $cm^{-1}$). More importantly, PS-CATS and the unsulfonated PS-CAT polymers have similar selectivities for $Fe^{3+}$. The polymer-supported ((PS-$CATS)_2$-Fe)$^-$ complex is shown as follows:

The kinetics of $Fe^{3+}$, $(Fe(SCN)_4)^-$, λ 460 nm) in its removal from solution, via ligand exchange, with the PS-CATS beads at pH 2.1 is readily accomplished by UV-vis experiments in a thermostated cuvette equipped with a stirring bar, from which linear plots of ln A (absorbance) vs t (sec) provided a pseudo first order rate constant of $4.2 \times 10^{-4}$ $sec^{-1}$ at 25° C. (FIG. 3). The hydrophilic PS-CATS beads cooperate by sinking to the bottom of the cuvette before they reacted with ($Fe(SCN)_4$). On the other hand, the unsulfonated version, PS-CAT, floats on the surface. These results show that maximum diffusion of $Fe^{3+}$ occurs into the macropores when the sulfonic acid group is bonded to the catechol ligand.

Figure 4:
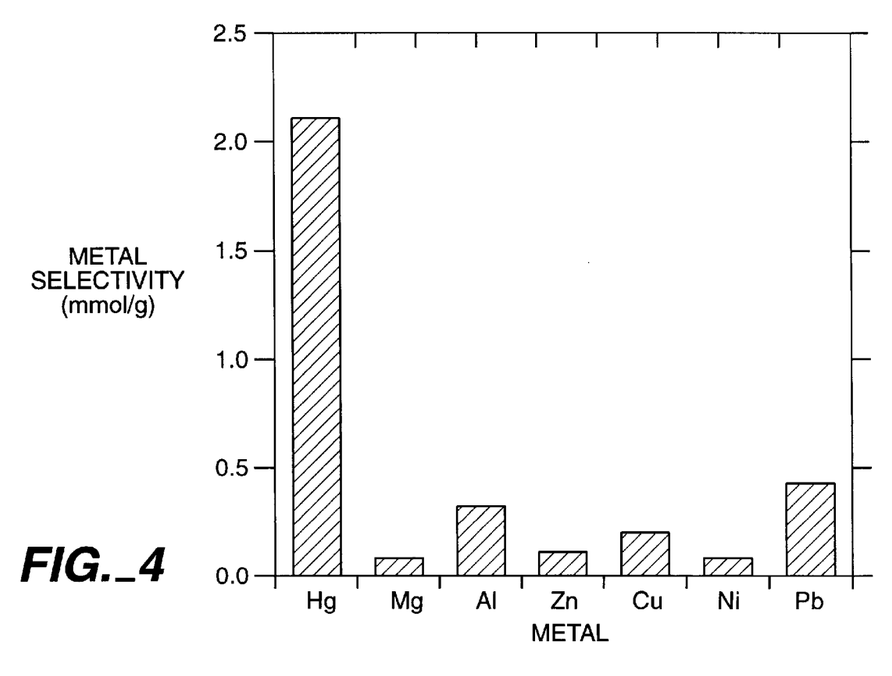
FIG. 4 is a graphic representation of metal selectivity of the PS-CATS ligand at pH 3.0.

By raising the pH to 3.0, and replacing $Fe^{3+}$ (insoluble at pH>3.0), with $Hg^{2+}$ the PS-CATS selectivity was changed to $Hg^{2+}$ in the presence of $Mg^{2+}$, $Al^{3+}$; $Zn^{2+}$, $Cu^{2+}$, $Ni^{2-}$, $Pb^{2+}$ (see FIG. 4). At equilibrium, the PS-CATS/$Hg^{2+}$ ratio is close 1:1 ($Hg^{2+}$ capacity on the PS-CATS beads at equilibrium was 2.4 mmol/g). Thus, the selectivity to other metal ions is possible, as a function of pH.

Figure 5:
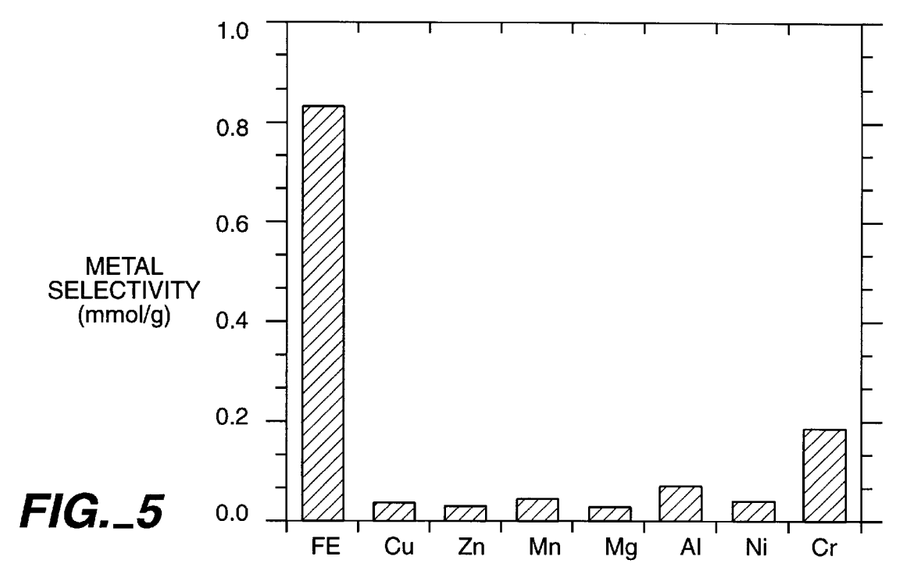
FIG. 5 is a graphic representation of metal selectivity of the PS-3,3-LICAMS ligands (0.53 mmol/g) at pH 2.1.

PS-3,3-LICAMS Metal Ion Selectivity, Selectivity Coefficients Values ($K_m$), and Kinetic Studies, as a Function of pH Experiments similar to those described above using PS-3, 3-LICAMS, a ligand that is predisposed for octahedral $Fe^{3+}$ complexation, provide an even greater selectivity for $Fe^{3+}$ ion in comparison to PS-CATS in the presence of $Cu^{2+}$, $Zn^{2+}$, $Mn^{2+}$, $Al^{3-}$, $Ni^{2-}$ and $Mg^{2+}$ ions (0.02M) at pH 2.1. The maximum $Fe^{3+}$ ion removal from solution was observed. The selectivity for $Fe^{3+}$ ion in the presence of competitors is shown in FIG. 5. The equilibrium selectivity coefficients ($K_m$ values) were also found, relative to $Mg^{2+}$ as the standard, to be: ($M^{n+}/Mg^{2+}$); 1817 ($Fe^{3+}$); 443 ($Cr^{3+}$); 121 ($Al^{3+}$); 4 ($Cu^{2+}$); 2 ($Zn^{2+}$); 6 ($Mn^{2+}$); 3 ($Ni^{2+}$); 1 ($Mg^{2+}$) and demonstrates that PS-3,3-LICAMS exhibit unique selectivity for $Fe^{3+}$ in competition with other metal ions.

Moreover, the equilibrium selectivity coefficient for PS-3, 3-LICAMS was about 11 times greater than PS-CATS for $Fe^{3+}$. This result clearly demonstrates that octahedral predisposition provides the thermodynamically more stable $Fe^{3+}$ complex.

At equilibrium, the PS-3,3-LICAMS/$Fe^{3+}$ ratio was 0.63:1 ($Fe^{3+}$ removal capacity at equilibrium was found to be 0.84 mmol/g). This result indicates that complexes other than the 1:1 complex may be formed on the polymer. The bonding of the proposed 1:1 complex, ((PS-3,3-LICAMS)-$Fe^{3+})^{3-}$ also appears to be exclusively to the catechol groups rather than the sulfonic acid substituents, via FT-IR spectra, with the free sulfonic acid bands, $v_{S=O}$, at 1223 and 1175 $cm^{-1}$. The catechol $v_{C-O}$ stretch is shifted from 1270 $cm^{-1}$ for the polymer bound ligand to 1257 $cm^{-1}$ for the $Fe^{3+}$ complex. The structure for the 1:1 ((PS-3,3-LICAMS)-$Fe)^{3-}$ complex is as shown below:

[PS-(3,3-LICAMS)Fe]$^{3-}$

The rates of $Fe^{3+}$ removal by the PS-3,3-LICAMS beads at pH 2.1 were also studied by Uv vis techniques. They provided a pseudo first order rate constant of $7.2 \times 10^{-4}$ $sec^{-1}$ at 25° C. The kinetic results demonstrate that sulfonation of either the PS-CAT or PS-3,3-LICAM ligands, in comparison to their unsulfonated analogs, is more important for rates and capacities (10 fold increase for each parameter) of metal removal, since it helps eliminate diffusional effects in aqueous solution. In other words, sulfonation causes the catechol ligand to be more hydrophilic, while lowering the $pK_a$ of catechol (OH) ionization, and raising the oxidation potential of o-quinone formation. Global sulfonation of polymer backbones was previously utilized to increase the overall polymer hydrophilicity. However, this does not always lead to selective metal ion reactions. Non-selective sulfonation causes a dramatic loss in metal ion selectivity of the PS-3, 3-LICAM ligand. However, the present invention of selective sulfonation on the polymer pendant catechol ligand site, as demonstrated herein, preserves the metal ion selectivity when comparisons are made to the unsulfonated analog, while at the same time providing the added beneficial rate and hydrophilic properties.

The kinetics of $Fe^{3+}$ removal by the PS-3,3-LICAMS beads at pH 2.1 is also accomplished by UV-vis experiments, which provide a pseudo first order rate constant of $7.2 \times 10^{-4}$ $sec^{-1}$ at 25° C. These kinetic results clearly indicate that sulfonation of either the PS-CAT or PS-3,3-LICAM ligands, in comparison to their unsulfonated analogs, is more important for rates and capacities about a (10 fold increase for each parameter) of metal removal. The sulfonation helps eliminate diffusional effects in aqueous solution; i.e. sulfonation makes the catechol ligand more hydrophilic, while lowering the $pK_a$ of catechol (OH) ionization, and raising the oxidation potential for o-quinone formation.

PS-2-6-LICAMS Metal Ion Selectivity, Selectivity Coefficients Values ($K_m$), and Kinetic Studies, as a Function of pH The synthesis of a series of bis-linear catechol amides, PS-2-6-LICAMS (Equation 2 above), permits the changing the cavity size (2-$CH_2$ to 6-$CH_2$) between the two catechol groups on the linear amide chain and the ascertaining of whether or not this modification allows a selectivity to different divalent metal ions. Table 1 compares the PS-2-6-LICAMS derivatives with several divalent and trivalent metal ions and clearly shows the lack of selectivity. All the PS-2-6-LICAMS derivatives provided very similar removal capacities for the variety of metal ions studied.

Figure 6:
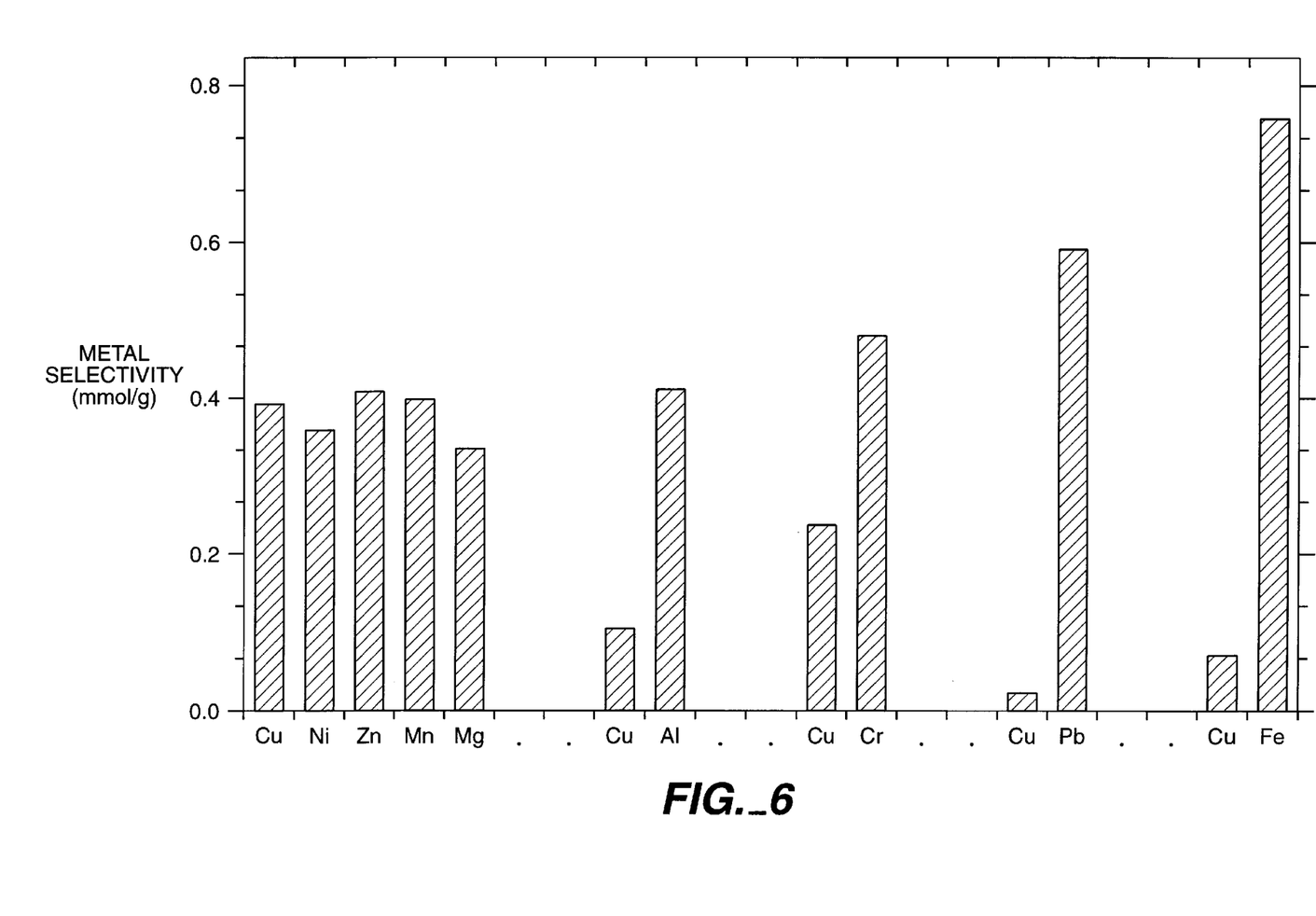
FIG. 6 is a graphic representation of metal selectivity of the PS-2-6-LICAMS ligand (average, 0.55 mmol/g) at pH 2.1.

While there appears to be no selectivity differences between the divalent metal ions (Table 1), the selectivity to trivalent metal ions, such as $Fe^{3+}$, $Cr^{3+}$, and $Al^{3+}$ still dominates in this series of polymer pendant ligands as it did in both the PS-CATS and 3,3-LICAMS beads and is shown in FIG. 6. The average mmol/g values for divalent metal ion removal for the PS-2-6-LICAMS series, in comparison to the PS-3,3-LICAMS and the PS-CATS ligands, indicates that the predisposed, square-planar PS-2-6 LICAMS ligands have a higher selectivity for the divalent emtal ions.

The equilibrium selectivity ($K_m$) values were also found, relative to $Mg^{2+}$ as the standard to be: ($M^{n+}/Mg^{2+}$); 65 ($Fe^{3+}$); 28 ($Cr^{3+}$); 6 ($Al^{3+}$); 1 ($Cu^{2+}$); 1 ($Zn^{2+}$); 1 ($Mn^{2+}$); 1 ($Ni^{2+}$); 1 ($Mg^{2+}$). These results further demonstrate the higher selectivity to the divalent metal

TABLE 1

Metal Selectivity for Polymer-Supported 2- to 6-LICAMS Ligands[a]

| PS-LICAMS | $Ni^{2+}/Cu^{2+}$ (mmol/g) | $Zn^{2+}/Cu^{2+}$ (mmol/g) | $Mn^{2+}/Cu^{2+}$ (mmol/g) | $Fe^{3+}/Cu^{2+}$ (mmol/g) |
|---|---|---|---|---|
| PS-2-LICAMS | 0.354/0.409 | 0.346/0.393 | 0.384/0.352 | 0.737/0.069 |
| PS-3-LICAMS | 0.375/0.436 | 0.359/0.411 | 0.382/0.349 | / |
| PS-4-LICAMS | 0.363/0.427 | 0.361/0.411 | 0.411/0.379 | / |
| PS-5-LICAMS | 0.347/0.406 | 0.370/0.419 | 0.377/0.349 | / |
| PS-6-LICAMS | 0.351/0.406 | 0.332/0.392 | 0.408/0.379 | 0.776/0.069 |

Figure 7:
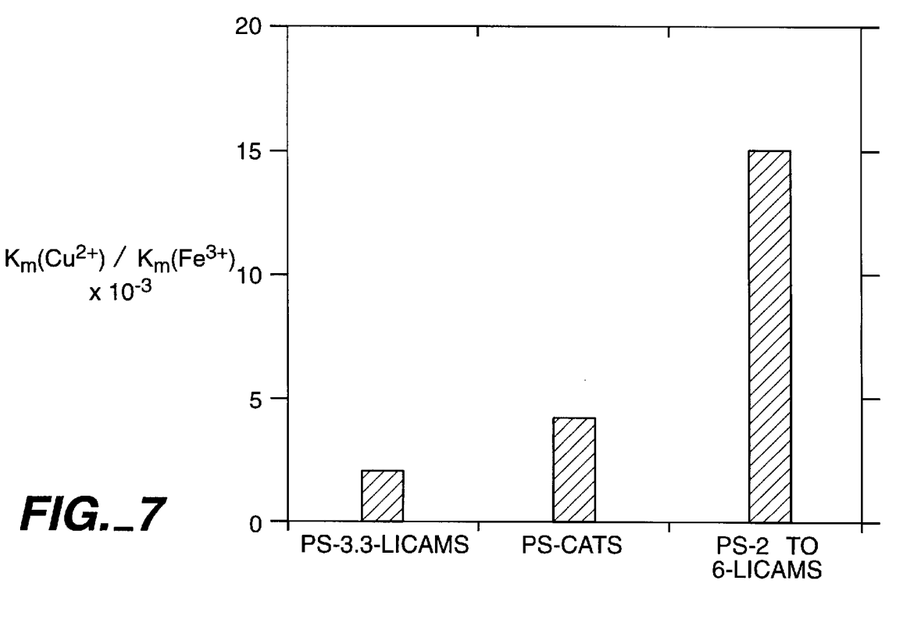
FIG. 7 is a graphic representation of comparison of $K_m Cu^{2+}/Fe^{3+}$ ratios for PS-CATS, PS-3,3-LICAMS and PS-2-6-LICAMS ligands.

[a]See the experimental section for details ions compared to the 3,3-LICAMS and PS-CATS ligands. The selectivity to $Fe^{3+}$ is concomitantly diminished in the PS-2-6 LICAMS series with $Fe^{3+}$ $K_m$ ratios of 3,3-LICAMS/PS-2-6 LICAMS=28 and the PS-CATS/2-6 LICAMS ratio was found to be 2.6. Moreover, comparison of the $K_m$ ratios, $Cu^{2+}/Fe^{3+}$, for all the polymer pendant ligands studied, again emphasizes that the PS-2-6 LICAMS series of ligands are more selective to $Cu^{2+}$, and therefore, to all divalent metal ions (FIG. 7). The kinetics of $Fe^{3+}$ ion removal by the PS-2-LICAMS ligand at pH 2.1 is also accomplished by UV-vis experiments, which provide a pseudo first order rate constant of $2 \times 10^{-4}$ $sec^{-1}$ at 25° C. Thus, the order of the rate of removal of $Fe^{3+}$ ion from a pH of 2.1 solution is: 3,3-LICAMS>PS-CATS>PS-2-LICAMS with a rate ratio of 4:2:1, respectively.

An example of a divalent metal complex ($Cu^{2+}$) with the PS-2-6-LICAMS series of beads is shown below:

[PS-2-6-LICAMS-Cu]$^{2-}$

Figure 8:
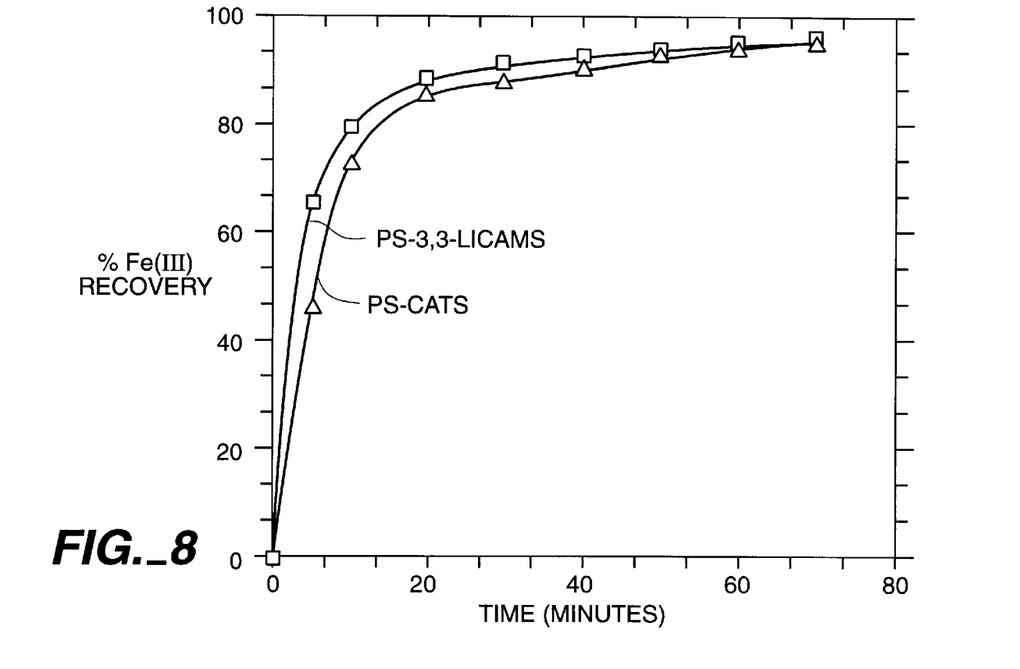
FIG. 8 is a graphic representation of the % $Fe^{3+}$ recovery rates from PS-CATS-Fe and PS-3,3-LICAMS-Fe ligands with 2N $H_2SO_4$.
Figure 9:
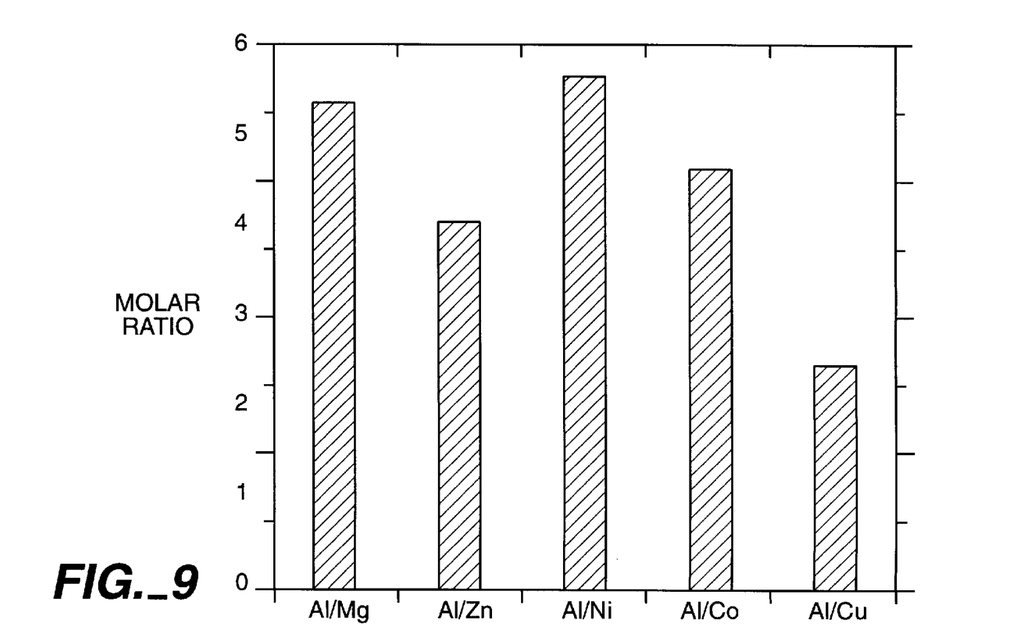
FIG. 9 is a graphic representation of the aluminum selectivity of PS-CATS at pH 3.0 in a solution in the presence of manganese, zinc, nickel, cobalt and copper ions and in the absence of iron ion.

Recovery of the Complexed Fe$^{3+}$ From PS-CATS and 3,3-LICAMS by Sulfuric Acid Treatment The total recovery of Fe$^{3+}$ ions from the PS-CATS and 3,3-LICAMS beads, for continual reuse, is readily accomplished with 2N H$_2$SO$_4$ as is shown in FIG. 8. Removal (pH 2.1) and subsequent recovery (2N H$_2$SO$_4$) of Fe$^{3+}$ from aqueous solution with both PS-CATS or 3,3-LICAMS beads is accomplished several times without loss of selectivity or capacity, thus demonstrating the effectiveness of these materials for future environmental or analytical applications.

A major discovery of the selectivity to trivalent and divalent metal ions, with polymer pendant ligands that have a biomimetic connection to the structures of biological ligands, is that the concept of predisposition that was successfully applied to the homogenous versions (see K. N. Raymond, et al (1990), T. D. P. Stack, et al (1992, 1993) and C. G. Perpont, et al (1994)) of these ligands, and especially for Fe$^{3+}$, is also a viable concept for the polymer-supported analogues. This finding is clearly demonstrated by comparing the selectivity of the octahedrally, predisposed PS-3,3-LICAMS ligand with the non-disposed PS-CATS ligand for Fe$^{3+}$ ions as reflected in the 11 fold selectivity coefficient (K$_m$) ratio (PS-3,3-LICAMS/PS-CATS) in favor of the polymer-supported, biomimetic enterobactin analogue, PS-3,3-LICAMS.

This finding is further demonstrated in the kinetics of Fe$^{3+}$ ion removal from a pH 2.1 solution, where the rate (k) ratio of PS-3,3-LICAMS/PS-CATS was about 2, while the rate ratio of PS-3,3-LICAMS/PS-2-6-LICAMS was 4. In addition, the square-planar, predisposed PS-2-6-LICAMS series of ligands are more selective to divalent metal ions as compared to the PS-3,3-LICAMS and PS-CATS ligands. At the same time, no selectivity for any divalent metal ions is observed within the PS-2-6-LICAMS series which clearly signifies that this series of polymer pendant ligands have maximum flexibility to accommodate these metal ions.

The trivalent metal ions for all the polymer pendant ligands studied were more readily removed from aqueous solution in comparison to the divalent metal series, with the following order of selectivity: Fe$^{3+}$>Cr$^{3+}$>Al$^{3+}$. This trivalent metal ion selectivity is similar for all the polymer pendant ligands studied. The comparison of the PS-CATS results with those of Griesbach, et al (1980) and Lieser (1980) for an azo linked TIRON polymer pendant ligand is valuable. Griesbach et al. (1980) report that the K$_d$ value for Cu$^{2+}$ removal is higher than that for Fe$^{3+}$ at a pH of 2.3, while the present invention is diametrically opposite. The K$_m$ ratio of Fe$^{3+}$/Cu$^{2+}$ for PS-CATS is 214 at pH 2.1 (and others report a Kd ratio of 0.03 for Fe$^{3+}$/Cu$^{2+}$). While not wanting to be bound by theory, it appears that the reason for the selectivity differences between these polymer-supported 3,5-sulfonate catechol ligands is that the azo linkages are not spectator ligands, and in fact, they are more selective to Cu$^{2+}$ than Fe$^{3+}$. This premise correlates with the reported data of Griesbach et al (1980) and provides a warning that control experiments need to be run if reactive linkages are to be used to anchor other polymer pendant ligands.

By changing the pH of the solution, as exemplified with PS-CATS, from 2.1 to 3.0, the selectivity is changed to Hg$^{2+}$, in the absence of Fe$^{3+}$, and in the presence of Mg$^{2+}$, Al$^{3+}$, Zn$^{2+}$, Cu$^{2+}$, Ni$^{2+}$, and Pb$^{2+}$ ions. Thus, it is possible to selectively remove specific ions based on a change of pH; i.e. first selectively remove Fe$^{3+}$ (if present in the solution) then change pH to selectively remove Hg$^{2+}$, then change pH again to selectively remove another cation. There results demonstrate the wide utility of these polymer pendant ligands for future environmental remediation applications.

The recovery of the metal ions from the polymer pendant ligands, an important step for reusing these polymer beads, is also found to be a very facile process with a 2N H$_2$SO$_4$ treatment providing >95% of the bound Fe$^{3+}$. This result is demonstrated with PS-CATS and PS-3,3-LICAMS for the Fe$^+$ ion and shows the rapid recovery of the metal ion from the polymer beads (FIG. 8). Thus, selective removal and facile recovery of metal ions from aqueous solutions has been demonstrated. This biomimetic approach appears to be viable for a variety environmentally and economically important metal ions.

The novel polymer-supported PS-3,3-LICAMS, PS-2-6-LICAMS, and PS-CATS ligands have similar Fe$^{3+}$ ion selectivities as their homogeneous analogs in competition with other metal ions. The sulfonic acid substituent dramatically improves the kinetics and capacities of Fe$^{3+}$ ion removal for all the polymer-supported ligands studied (10 fold) in comparison to their unsulfonated analogs. The thermodynamic parameter of predisposition of catechol ligands (chelate effect) appears to be more important for the improved selectivity of 3,3-LICAMS toward Fe$^{3+}$ ion (higher K$_m$ value) removal from aqueous acidic solutions in comparison to the PS-CATS ligand. The PS-2-6-LICAMS are also more selective to divalent metal ions due to their predisposition for square planar coordination. However, no differences are observed within the series itself. Additional research is planned on polymer pendant ligand chemistry to include selectivity studies for radionuclides with the PS-CATS, 2-6-LICAMS, and 3,3-LICAMS ligands.

Radionuclide Removal Experiments Performed with PS-CATS and PS-3,3-LICAMS

Polymer pendant ligands, PS-CATS and PS-3,3-LICAMS, were evaluated for applications to radionuclide removal from principally low level radioactive DOE waste sites.

Table 2 demonstrates the excellent selectivity to many radionuclides at the pH values of 1.5(*) and 1.75(**) with PS-CATS and PS-3,3-LICAMS. It should be noted that K$_d$ values >10,000 are not reliable, but show that relatively little radioactivity remains in solution.

Radionuclide Removal Experiments Performed with PS-CATS and PS-3,3-LICAMS

Polymer pendant ligands, PS-CATS and PS-3,3-LICAMS, have been evaluated for applications to radionuclide removal from principally low level radioactive DOE waste sites.

Table 2 demonstrates the excellent selectivity to many radionuclides at the pH values of 1.5 and 1.75 with PS-CATS and PS-3,3-LICAMS. A word of caution should be noted that $K_d$ values >10,000 are not reliable, but show that relatively little radioactivity remains in solution.

TABLE 2

| ABSORBER | ELEMENT | Kd (30 min) | Kd (2 hr) | Kd (6 hr) |
|---|---|---|---|---|
| 3,3-LICAMS* | Y | 22517 | 230000 | 20000 |
| 3,3-LICAMS* | Fe | 19999 | 46872 | 57928 |
| 3,3-LICAMS* | Mn | 9735 | 20388 | 19063 |
| 3,3-LICAMS* | Ni | 8807 | 12039 | 11794 |
| 3,3-LICAMS* | Co | 8606 | 13193 | 11975 |
| 3,3-LICAMS* | Zn | 8053 | 11351 | 12226 |
| 3,3-LICAMS* | U | 5287 | 17658 | 24427 |
| 3,3-LICAMS* | V | 3149 | 4480 | 4922 |
| 3,3-LICAMS* | Zr | 501 | 1444 | 6090 |
| CATS* | Y | 6374 | 16988 | 28627 |
| CATS* | Mn | 2624 | 5845 | 7082 |
| CATS* | Zn | 2204 | 4106 | 4724 |
| CATS* | Co | 2132 | 3803 | 4658 |
| CATS* | Ni | 2001 | 3089 | 5019 |
| CATS* | Fe | 1868 | 3947 | 4900 |
| CATS* | U | 1155 | 2222 | 4558 |
| CATS* | V | 353 | 534 | 623 |
| CATS* | Zr | 70 | 135 | 271 |
| 3,3-LICAMS** | Sr | 9522 | 25865 | 23853 |
| 3,3-LICAMS** | Cs | 1487 | 1611 | 1547 |
| 3,3-LICAMS** | Am | 1334 | 6613 | 47258 |
| 3,3-LICAMS** | Ce | 1153 | 4393 | 7668 |
| 3,3-LICAMS** | Tc | 49 | 279 | 53 |
| 3,3-LICAMS** | Cr | 21 | 25 | 24 |
| CATS** | Sr | 6687 | 6920 | 14106 |
| CATS** | Cs | 1772 | 3300 | 2677 |
| CATS** | Am | 471 | 6930 | 97395 |
| CATS** | Ce | 454 | 2648 | 4956 |
| CATS** | Cr | 30 | 33 | 35 |
| CATS** | Tc | 2.0 | 3.0 | 3.9 |

*pH 1.5
**pH 1.75

Table 3 shows the results of a Hanford Simulant (NCAW), at a pH of 14, containing high salt concentration. Under these stringent conditions, the Kd values are dramatically lowered. The PS-CATS and PS-3,3-LICAMS beads appear to have some application for the removal and recovery of important radionuclides of Cs and Sr that pose problems at the lower levels of radioactivity, and are in waste solutions that are at acidic pH values.

TABLE 3

| ABSORBER | ELEMENT | Kd (30 min) | Kd (2 hr) | Kd (6 hr) |
|---|---|---|---|---|
| CATS | Sr | 131 | 318 | 497 |
| CATS | Fe | 78 | 285 | 599 |
| CATS | Mn | 57 | 360 | 696 |
| CATS | Y | 38 | 89 | 175 |
| CATS | Zr | 20 | 80 | 217 |
| CATS | Ni | 12 | 24 | 33 |
| CATS | CS | 1 | 12 | 11 |
| CATS | Co | 4.6 | 15 | 34 |
| CATS | Zn | 2.7 | 4.4 | 5.5 |
| CATS | Tc | 0.8 | 0.5 | 0.4 |
| CATS | Cr | <0.1 | <0.1 | <0.1 |
| CATS | V | <0.1 | <0.1 | <0.1 |
| 3,3-LICAMS | Sr | 64 | 153 | 236 |
| 3,3-LICAMS | Fe | 43 | 259 | 574 |
| 3,3-LICAMS | Y | 15 | 49 | 94 |
| 3,3-LICAMS | Zr | 6.6 | 33 | 130 |
| 3,3-LICAMS | Mn | 6.6 | 18 | 27 |
| 3,3-LICAMS | Ni | 6.1 | 15 | 21 |
| 3,3-LICAMS | Tc | 3.0 | 3.1 | 3.1 |
| 3,3-LICAMS | Cs | 1.6 | 1.5 | 1.4 |
| 3,3-LICAMS | Co | 1.5 | 3.4 | 4.9 |
| 3,3-LICAMS | Zn | 0.2 | 0.3 | 0.3 |
| 3,3-LICAMS | Cr | <0.1 | <0.1 | <0.1 |

The following Examples are provided to be illustrative and descriptive only. They are not to be construed to be limiting in any way.

GENERAL—The chemicals purchased were used as obtained. Solvents were purified and degassed, while all manipulations were performed in air, unless otherwise noted.

Physical measurements. UV/vis spectra were recorded on a Hewlett Packard 8452A diode array spectrophotometer. FT-IR spectra were determined as a solid, in a KBr matrix, in the mid-IR region (400 to 4000 cm$^{-1}$) with the use of a computer controlled Nicolet Impact 400 FT-IR spectrometer. Elemental analyses performed by either the Department of Chemistry Microanalytical Laboratory at the University of California, Berkeley or Galbraith Laboratories, Inc., Knoxville, Tenn. Metal analyses performed either by X-ray fluorescence spectrometry or by atomic absorption spectrometry. The CP-MAS$^{13}$C NMR spectra were obtained using a 100 MHz solid state NMR spectrometer instrument, built by the Reimer group, Department of Chemical Engineering, University of California, Berkeley, and operating at a field strength of 2.3T at 25.1 MHz for $^{13}$C NMR. The $^{13}$C NMR spectra were obtained with a spectral width of 10K Hz, a line-broading of 5 Hz, an acquisition time of 26 ms, last delay of 3 s, and a cross polarization of 2 ms.

EXAMPLE 1

Chloromethylation of Amberlite-XE-298A

This reaction was carried out with a procedure described by Warshawsky. A. Warshawsky et al (1984), *Br. Polym. J.*, 16, p. 234. In a typical reaction, a sample of dry Amberlite-XE-298A polymer beads (20.0 g, 6% crosslinked, Rohm and Haas, Philadelphia, Pa.) was swelled in a $CH_2Cl_2$ solution (140 ml) consisting of 3M $CH_2ClOCH_2(CH_2)_6CH_3$ for 30 min. After $SnCl_4$ (4.0 ml) was added, the reaction was stirred at room temperature for 6 h. The polymer was then washed with $CH_2Cl_2$, dioxane, $H_2O$ and MeOH, and dried under vacuum at 60° C. for 24 h. Elemental analysis showed 6.33% Cl (1.78 mmol/g).

EXAMPLE 2

Sulfonation of PS-CAT

PS-CAT (catechol, 2.3 mmol/g) was synthesized adapting a procedure described by R. H. Fish et al. (1985) (1987), Fuming sulfuric acid (18–22%) was purchased from Aldrich Chemical Co. with no further purification. All reactions were carried out under an inert atmosphere, e.g. nitrogen. The PS-CAT (5 g, 2.3 mmol/g) beads were added in portions to the fuming sulfuric acid (20 mL) in a flask immersed in an ice bath. The mixture was left standing at 0° C. for about 3 hr, then warmed up to room temperature. After 2 hr, the mixture was poured onto ice. The beads were filtered, and washed in the following order: $H_2O$, 5% $Na_2CO_3$ solution, $H_2O$, $CH_3OH$, and diethyl ether. The PS-CATS beads were finally dried at 60° C. overnight in vacuum.

Analysis for PS-CATS showed 1.9 mmol/g of catechol, 12.4% S (3.9 mmol/g of sulfonic acid substituents); The FT-IR data for PS-CATS (KBr, cm$^{-1}$): 1292 (C—O); 1220 and 1075 (S=O). CP-MAS$^{13}$C NMR Data (referenced to TMS, ppm): 138.31, 132.08, 127.40 (for comparison a CP-MAS$^{13}$C NMR spectrum for TIRON is as follows: 144.55, 134.03, 120.39).

EXAMPLE 3

Kinetics Procedure for the Reaction of PS-CATS and PS-3,3-LICAMS with $Fe^{3+}$ Ions Experiments were run at 25° C. at various pH values using a thermostated cuvette in an HP 8452A UV-vis spectrophotometer. A typical procedure is as follows: The PS-CATS or PS-3,3-LICAMS beads (10 mg) were added to a cuvette with a small magnetic stirring bar and charged with 4 mL of a solution of $Fe(NO_3)_3$ (20 mM) and KSCN (0.8 mM); $(Fe(SCN)_4)^-$. The rate of $Fe^{3+}$ removal was measured using the HP kinetic software package from the decay of the absorbance at 460 nm for the PS-CATS and 452 nm for PS-3,3-LICAMS, every 5 min for 70 min, and every 2 minutes for 30 minutes, respectively.

The general equation for a first order reaction was used to calculate the rate constants: $C = C_o e^{-kt}$, where C is the concentration at time t, and $C_o$ is the concentration at time 0, while k is the first order rate constant. The UV-Vis measures absorbance, which is a linear function of concentration. The slope of the In A vs time plot gives the rate constant, k. For the initial rate, it is assumed that $Fe^{3+}$ decrease, is probably due to saturation of the beads present in the cuvette or to diffusion factors. The $Fe^{3+}$ removal pseudo first order rate constants for both the PS-3,3-LICAMS and PS-2-6-LICAMS ligands were normalized due to the concentration differences between them and the PS-CATS ligand.

EXAMPLE 4

$K_m$ Selectivity Coefficient Determination Procedure

A typical experiment is: The PS-CATS (50 mg) beads were added to a solution (50 mL) of $Fe(NO_3)_3$(0.02M) and $M(NO_3)_x$(0.02M). The mixture was shaken for about 14 hrs to ensure complete reaction. The PS-CATS beads were filtered, washed with $H_2O$, $CH_3OH$, ether, and dried in vacuum. The beads were analyzed for $Fe^{3+}$ and $M^{n+}$ using X-ray fluorescence (XRF) analysis. The concentrations of $Fe^{3+}$ and $M^{n+}$ in the solution were calculated from the mass balance. Selectivity coefficients ($K_m$) were calculated for each metal according to the following method:

$$n\ Fe^{3+} + 3\bar{M}n^+ \Longleftrightarrow 3\bar{M}^{n+} + \bar{n}\ Fe^{3+}$$
(bar indicates resin phase)

$$K_{Fe/M} = \frac{(q\text{Fe})^n (C_M)^3}{(C_{Fe})^n (q\text{M})^3}$$

$q$ = equilibrium concentration on the bead
$C$ = equilibrium concentration in solution or for $n \neq 3$ $$K_{Fe/M} = \frac{(q\text{Fe})(C_M)}{(C_{Fe})(q\text{M})}$$

Final $K_m$ values were normalized by allowing $K_{Mg} = 1$.

For example $K_{Fe/Mg} = 1817$, so $K_{Fe} = 1817$ for *PS-3, 3-LICAMS*.

EXAMPLE 5

Recovery Procedure for $Fe^{3+}$ Ions

The PS-CATS-Fe for Ps-3,3-LICAMS-Fe polymer beads (50 mg) were added to 2N $H_2SO_4$ (40 mL). The % $Fe^{3+}$ removal from the beads was calculated from the residual concentration of $Fe^{3+}$ on the beads using XRF analysis.

EXAMPLE 6

Preparation of PS-3.3-LICAM Beads

To 20.0 g (35.6 mmol) of chloromethylated Amberlite-XE-298A beads, swelled in 100 ml of dioxane for 1 h, was added dropwise, under $N_2$, 14.0 g(106.8 mmol) of 3,3-iminobispropylamine, $(H_2N(CH_2)_3NH(CH_2)_3NH_2)$, in 30 ml of dioxane. After stirring at room temperature for 30 h, the beads were washed with dioxane, $H_2O$/dioxane (1:1), $H_2O$ and MeOH, and then dried under vacuum at 60° C. for 15 h, and 22.94 g of off-white beads were obtained. Elemental analysis showed 3.01% N(0.72 mmol/g of 3,3-iminobispropylamine and 1.49% Cl, 64% yield). To 20.0 g(14.4 mmol) of the above-mentioned aminated Amberlite-XE-298A beads in 100 ml THF was added dropwise 50 ml of a THF solution containing 10.8 g(53.8 mmol) of 2,3-dimethoxybenzoyl chloride followed by a dropwise addition of a 20 ml THF solution containing 7.0 (69.3 mmol) of triethylamine. The reaction was kept at 50° C. with gentle agitation for 2 days. After the triethylamine hydrochloride precipitate was decanted from the solvent, the polymer was washed with dioxane/MeOH (1:1), MeOH, $H_2O$ and MeOH. The product beads were dried under vacuum at 60° C. for 10 h and weighed 26.6 g (99.2% yield). This product was then welled in 150 ml of $CH_2Cl_2$ for 30 min and to this was added dropwise at 0° C., 25.0 g of $BBr_3$ (25.0 g, 99.8 mmol) in 50 ml of $CH_2Cl_2$. After the reaction was stirred under $N_2$ at 0° C. for 14 h, the solvent was decanted, and 100 ml of deionized $H_2O$ was slowly added. The polymer was then soaked in $H_2O$ for 10 h and washed with MeOH, and then dried under vacuum at 60° C. for 20 h. The PS-3,3-LICAM polymer beads, thus obtained, analyzed for 2.46% N (0.59 mmol/g) of the 3,3-LICAM ligand.

EXAMPLE 7

Sulfonation of the PS-3,3-LICAM Beads

Thus, 5.0 of PS-3,3-LICAM beads were swelled in 50 ml of $CH_2Cl_2$ for 1 h, then filtered and air-dried for 2 h. The solvent treated polymer was added to 50 ml of cold 93% $H_2SO_4$ and kept at this temperature for 15 min. to allow for diffusion of the acid into the polymer structure. After the reaction was allowed to warm up to room temperature during a 30 min time period, the polymer was filtered, and neutralized with a mixture of 200 g of ice containing 10 g of $Na_2SO_4$ and 1 g of NaOH. After thoroughly washing with deionized $H_2O$, the polymer beads were rinsed with MeOH and finally dried under vacuum at 60° C. for 14 h. The product thus obtained, PS-3,3-LICAMS polymer beads, showed 2.26% N (0.53 mmol/g of ligand or 1.62 mmol/g of catechol) and 5.59% S (1.75 mmol/g of sulfonic acid substituents). The FT-IR data for PS-3,3-LICAMS (KBr, cm$^{-1}$): 1460 (C—C); 1641(C=O); 1270(C—O); 1229 and 1179 (S=O).

EXAMPLE 8

Selectivity Studies with PS-3,3-LICAMS

Solutions were made that were 0.02M in both $Fe^{3+}$ and $M^{n+}$ (M=$Al^{3+}$, $Zn^{2+}$, $Mg^{2+}$, $Mn^{2+}$, $Ni^{2+}$, and $Cu^{2+}$). Nitrate salts were used for all metals except $Mn^{2+}$, where $MnCl_2$ was used. Reagent grade water was used to make the solutions. All solutions were adjusted to pH=2.1, and to each one was added 100 mg of the 3,3-LICAMS beads. The flasks were placed on a wrist-action shaker and allowed to shake for 16 hours, by which time the equilibrium was well established. The beads were washed with deionized water and acetone, vacuum dried, and analyzed using X-ray fluorescence for analysis of all metals except $Mg^{2+}$ and $Al^{3+}$, which were done by atomic absorption spectrophotometry.

EXAMPLE 9

Preparation of PS-2 to 6-LICAM Beads

These polymer pendant ligands were made using a similar procedure as described above for the synthesis of the PS-3, 3-LICAM beads. Typically, a sample of chloromethylated Amberlite-XE-298A beads (5.0 g, 8.9 mmol) was allowed to react with $H_2NCH_2(CH_2)_nCH_2NH_2$ (n=0–4, 28.0 mmol) in dioxane under nitrogen. The aminated Amberlite-XE-298A polymer was then allowed to react with 2,3-dimethoxybenzoyl chloride (1.8 g, 9.0 mmol) in THF in the presence of triethylamine (1.2 G, 12.0 mmol). After demethylation in $CH_2Cl_2$ with $BBr_3$ (4.0 g, 16.0 mmol) under $N_2$ at 0° C., the product was hydrolyzed with $H_2O$, washed with MeOH and dried under vacuum at 60° C. for 20 h. The ligand concentration was found to be about 0.61 mmol/g (an example analysis for N:1.71% N for the 4-LICAM polymer beads).

While only a few embodiments of the invention have been shown and described herein, it is apparent to those skilled in the art that various modifications and changes can be made in the selection of synthetic polymer and in the selection of the pendant chelating group to produce the chelating material to selectively remove trivalent ions, e.g. $Fe^{3+}$ from aqueous solutions particularly in the presence of competing metal ions and the process thereof without departing from the spirit and scope of the present invention. All such modifications and changes are intended to be carried out thereby.

I claim:

1. The process for the preparation of a polymer-ligand of Structure (II):

wherein POLYMER is a water insoluble polymer having multiple covalently attached ligands; and
Y in each ligand is independently selected from the group consisting of $SO_3H$ and $SO_3M$, where M is an alkaline metal, which process comprises
   (a) chloromethylating a phenyl containing polymer using chloromethylation reagents and conditions;
   (b) reacting the product of step (a) with a catechol in the presence of a Lewis acid catalyst at between about 20° and 100° C. and for between 0.5 and 72 hr;
   (c) reacting the product of step (b) with excess fuming sulfuric acid at about 0° C. and ambient temperature for between about 1 and 5 hr; and
   (d) isolating and recovering the polymer-ligand of Structure (II).

2. A process for the selective removal of a trivalent metal cation from an aqueous solution optionally in the presence of competing metal cations, which process comprises:
   (a) contacting the polymer-ligand of general Structure (I) or (II):

wherein
n is an integer from 2 to 6;
X and Y are independently selected from the group consisting of H, $SO_3H$, $SO_3M$, COOH, or COOM, provided that in Structure (I) both X or Y are not both hydrogen and provided that in Structure (II) Y is not H, M is a metal atom selected from the group consisting of alkali metals and alkaline earth metals with an aqueous solution of metal cations at ambient conditions for between about 0.01 and 60 min; and
   (b) separating the polymer-ligand/metal cation complex from the aqueous solution.

3. The process of claim 2 which further includes:
   (c) contacting the isolated polymer-ligand/metal cation complex of step (b) with water;
   (d) adding sufficient acid to alter the pH to release the metal cation; and
   (e) isolating the regenerated polymer of structure I or structure II.

4. A process for the selective removal of $Fe^{3+}$ from an aqueous solution in the presence of competing cations, which process comprises:
   (a) contacting the polymer-ligand of general structure (I) or (II):

wherein n is an integer from 2 to 6;

X and Y are independently selected from the group consisting of H, $SO_3$, H, $SO_3M$, COOH, or COOM, provided that in Structure (I) both X and Y are not both hydrogen and provided that in Structure (II) Y is not H, M is a metal atom selected from the group consisting of alkali metals and alkaline earth metal with an aqueous solution of metal cations including $Fe^{3+}$ at ambient conditions for between about 0.01 and 60 min; and (b) separating the polymer-ligand/$Fe^{3+}$ complex from the aqueous solution.

5. The process of claim 2 which further includes:

(c) contacting the isolated polymer-ligand/$Fe^{3+}$ complex of step (b) with water;

(d) adding sufficient acid to alter the pH to release the $Fe^{3+}$ ion; and (e) isolating the regenerated polymer-ligand of structure I or structure II.

6. The process of claim 2 wherein the trivalent ion is $Cr^{3+}$.

7. The process of claim 3 wherein, the trivalent metal is $Cr^{3+}$.

8. The process of claim 2 wherein the trivalent metal is $Al^{3+}$.

9. The process of claim 3 wherein the trivalent metal is $Al^{3+}$.

10. The process of claim 2 wherein the structure is structure (I).

11. The process of claim 2 wherein the structure is structure (II).

12. The process of claim 4 wherein the structure is structure (I).

13. The process of claim 4 wherein the structure is structure (II).

14. The process of claim 6 wherein the structure is structure (I).

15. The process of claim 6 wherein the structure is structure (II).

16. The process of claim 8 wherein the structure is structure (I).

17. The process of claim 8 wherein the structure is structure (II).

* * * * *